United States Patent [19]

Sonobe et al.

[11] Patent Number: 4,995,724
[45] Date of Patent: Feb. 26, 1991

[54] OPTICAL SPECTRUM ANALYZER WITH HIGH PERFORMANCE MEASUREMENT FUNCTION

[75] Inventors: Yoji Sonobe, Machida; Takao Tanimoto, Sagamihara, both of Japan

[73] Assignee: Anritsu Corporation, Tokyo, Japan

[21] Appl. No.: 393,805

[22] Filed: Aug. 14, 1989

[30] Foreign Application Priority Data

Aug. 18, 1988 [JP] Japan ................................. 63-205027
Jul. 28, 1989 [JP] Japan .................................. 1-194057

[51] Int. Cl.$^5$ ............................ G01J 3/18; G01J 3/32
[52] U.S. Cl. ..................................... 356/319; 356/323; 356/327; 356/328
[58] Field of Search ............... 356/319, 322, 323, 325, 356/326, 327, 328, 331, 332, 333, 334

[56] References Cited

FOREIGN PATENT DOCUMENTS

0284432 11/1988 Japan .................................... 356/319

*Primary Examiner*—F. I. Evans
*Attorney, Agent, or Firm*—Frishauf, Holtz, Goodman & Woodward

[57] ABSTRACT

A spectroscope device of the dispersion type receives light to be measured and emits it as dispersed light which corresponds to each of wavelengths to be measured. An optical-path switching device directs the dispersed light emitted from the spectroscope device to pass through first and second paths. A first photoelectric converter receives the light which is directed to pass through the first path by the optical-path switching device. A polarizing/separating device polarizes and separates the light, which is directed to pass through the second path by the optical-path switching device, into two polarized lights. Second and third photoelectric converters respectively receive the two polarized lights divided by the polarizing/separating device. An arithmetical process section corrects a first optical spectrum strength according to an output from the first photoelectric converter with at least a ratio of second and third optical spectrum strengths which correspond to outputs from the second and third photoelectric converter to calculate absolute spectrum values of the measured light at every wavelength of the light to be measured.

15 Claims, 9 Drawing Sheets

OPTICAL SPECTRUM ANALYZER WITH HIGH PERFORMANCE MEASUREMENT FUNCTION

BACKGROUND OF THE INVENTION

1. Field of the Invention

The present invention relates to an optical spectrum analyzer which uses spectroscope elements of the dispersion type such as a diffraction grating and prism and, more particularly, it relates to an optical spectrum analyzer capable of measuring, with high accuracy, the absolute value of an optical spectrum at every wavelength of light to be measured.

2. Description of the Related Art

In the case of the conventional optical spectrum. analyzer which measures an optical spectrum value at every wavelength $\lambda$ of light to be measured, the measured light entering through the inlet slit is introduced onto and diffracted by the diffraction grating. The light thus diffracted is received by the light receiving means through the outlet slit. An optical strength representing signal which is calculated from a photoelectric conversion signal corresponding to an angle $\phi$ of rotation of the diffraction grating and which is applied from the light receiving means is regarded as an optical spectrum value at every wavelength of the light to be measured.

Figure 11:
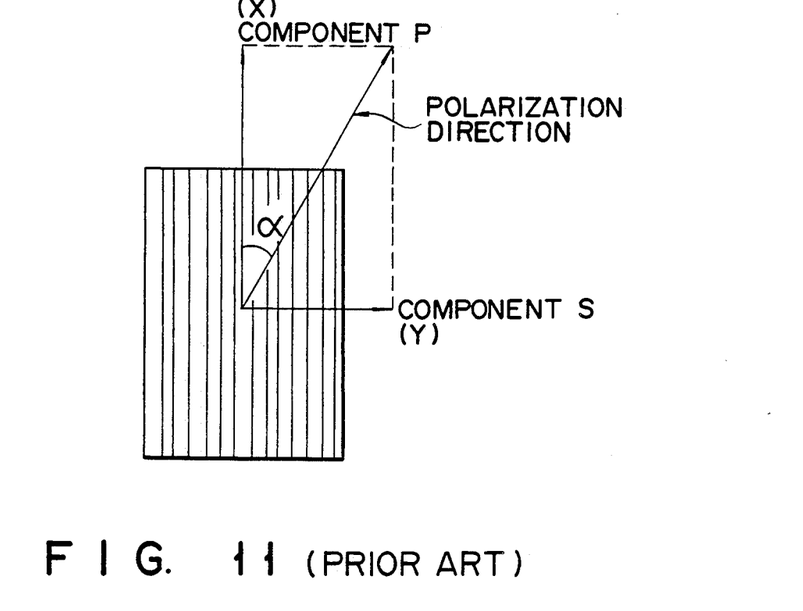
FIG. 11 shows a relation between the direction at which measured light is polarized and the direction at which grooves of a grating are carved.
Figure 12:
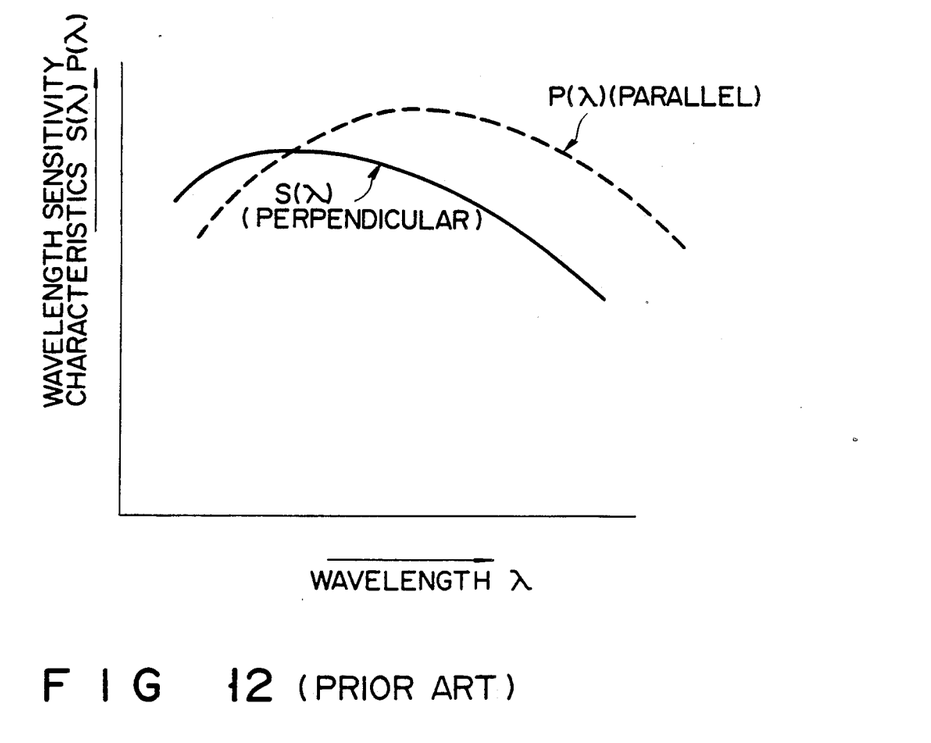
FIG. 12 is a graph showing grating efficiencies obtained by the diffraction grating.

As shown in FIG. 11, however, the polarization direction in the measured light is not certain but is optional to have an angle $\alpha$ relative to grooves of the diffraction grating 3. As shown in FIG. 12, the wavelength sensitivity characteristics $P(\lambda)$ of the grating in a direction parallel to its grooves is different from the wavelength sensitivity characteristics $S(\lambda)$ in a direction perpendicular to its grooves. Even when the measured light having the same wavelength components is subjected to spectrum analysis, therefore, the ratio of light (component P) polarized parallel to the grooves of the grating and light (component S) polarized perpendicular to the grooves thereof changes as the polarization direction in the measured light becomes different. It cannot be believed therefore that the optical spectrum value thus obtained is always correct at every wavelength $\lambda$.

Figure 10:
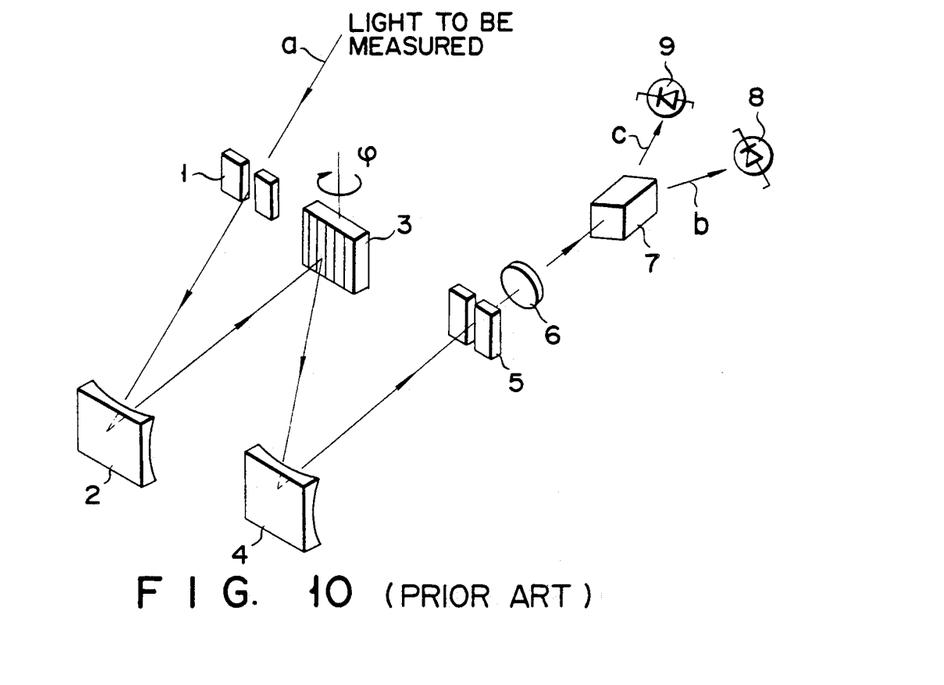
FIG. 10 shows the conventional example of the optical spectrum analyzer.

In order to eliminate the above-mentioned drawback, there is provided an optical spectrum analyzer wherein the diffracted light is divided into parallel- and perpendicularly-polarized lights by a polarizing element and these parallel- and perpendicularly-polarized lights are detected independently of one other, as shown in FIG. 10.

Measured light (a) entering from outside is passed through inlet slit 1, processed to have parallel rays by collimator mirror 2, and introduced onto diffraction grating 3. The light diffracted by diffraction grating 3 is collected by camera mirror 4 which is a concave mirror, and it is applied to polarizing element 7 through outlet slit 5 and lens 6. This polarizing element 7 is made of calcite and serves to divide the light, which has been applied to it, into light (b) polarized parallel to the grooves of diffraction grating 13 and light (c) polarized perpendicular to the grooves thereof. These parallel- and perpendicularly-polarized lights (b) and (c) are received by light receiving means 8 and 9, respectively.

It is assumed in this optical spectrum analyzer that optical strengths obtained by the photoelectric conversion signals at an optional wavelength $\lambda$ applied from parallel- and perpendicularly-polarized light receiving devices 8 and 9 are $I_X(\lambda)$ and $I_Y(\lambda)$. It is also assumed that the wavelength sensitivity characteristics in both of the directions relative to diffraction grating 3 and including conversion efficiency are $S(\lambda)$ and $P(\lambda)$, as shown in FIG. 12. True optical strengths $I_S(\lambda)$ and $I_p(\lambda)$ of the light incident onto diffraction grating 13 in either of the directions can be thus obtained from the following equations (1) and (2) wherein loss caused by polarizing element 7 is included in wavelength sensitivity characteristics in either of the directions relative to diffraction grating 13:

$$I_S(\lambda) = I_Y(\lambda)/S(\lambda) \quad (1)$$

$$I_P(\lambda) = I_X(\lambda)/P(\lambda) \quad (2)$$

Therefore, an absolute spectrum value $I(\lambda)$ at this wavelength $\lambda$ which does not depend upon the polarization direction (angle $\alpha$) in measured light (a) relative to grooves of diffraction grating 3 shown in FIG. 10, is calculated from the following equation (3):

$$\begin{aligned} I(\lambda) &= I_S(\lambda) + I_P(\lambda) \\ &= I_Y(\lambda)/S(\lambda) + I_X(\lambda)/P(\lambda) \end{aligned} \quad (3)$$

However, the following problem is still left unsolved by the optical spectrum analyzer which is arranged as shown in FIG. 10.

Polarizing element 7 which serves to divide the light, which has been diffracted by diffraction grating 3, into light polarized parallel to the grooves of diffraction grating 3 and light polarized perpendicular to the grooves thereof is usually made of calcite. However, optical the level is made low because of the scattering of light in calcite and because of the reflecting of light when it enters into calcite, and S/N ratio of parallel- and perpendicularly-polarized lights (b) and (c) applied from polarizing element 7 is also made low. High reliability is not obtained for the values of optical strengths $I_X(\lambda)$ and $I_Y(\lambda)$ which are obtained in both of the directions from optical photoelectric conversion signals applied from light receiving devices 8 and 9.

Reliability of the absolute spectrum value $I(\lambda)$ calculated from equation (3) using these measured optical strengths $I_X(\lambda)$ and $I_Y(\lambda)$ will be thus reduced.

Further, one light diffracted by diffraction grating 3 is divided into two polarized lights (b) and (c) by polarizing element 7. Absolute levels of divided polarized lights, (b) and (c) are thus made low. Therefore, the S/N ratio of each of these polarized lights (b) and (c) is further made low. As the result, the S/N ratio of each of the above-mentioned optical strengths $I_X(\lambda)$ and $I_Y(\lambda)$ is further made low and reliability of the absolute spectrum value $I(\lambda)$ finally calculated from equation (3) is thus reduced.

To summarize the above, the diffracting efficiency of the diffraction grating depends upon polarized waves in the case of the conventional optical spectrum analyzer of the diffraction grating type. In order to eliminate this polarized-waves dependency, there is used a technique of dividing light to be measured into component P (or parallel-polarized light) and component S (or perpendicularly-polarized light), detecting them and then multiplying them by the diffracting efficiency of the diffraction grating. However, level measuring accuracy is low because of loss caused by the polarizing element inserted.

The present invention is intended to eliminate the polarized-waves dependency of the diffraction grating while keeping the level measuring accuracy high.

SUMMARY OF THE INVENTION

An object of the present invention is to provide an optical spectrum analyzer wherein the optical strength ratio of each of parallel- and perpendicularly-polarized lights can be obtained and the optical strength of light not polarized is corrected by the optical strength ratio to enhance the S/N ratio of an absolute value of the optical spectrum at every wavelength of light to be measured and analyzed and thus enhance the measuring accuracy of the analyzer itself.

According to one aspect of the present invention, there is provided an optical spectrum analyzer comprising:

spectroscope means of the dispersion type for receiving light to be measured and emitting it as dispersed light which corresponds to each of wavelengths to be measured;

optical-path switching means for directing the dispersed light emitted from the spectroscope means to pass through first and second paths;

first photoelectric converter means for receiving the light which is directed to pass through the first path by the optical-path switching means;

polarizing/separating means for polarizing and separating the light, which has been directed to pass through the second path by the optical-path switching means, into two polarized lights;

second and third photoelectric converter means for respectively receiving the two polarized lights polarized and separated by the polarizing/separating means; and arithmetical process means for correcting a first optical spectrum strength according to an output from the first photoelectric converter means with at least a ratio of second and third optical spectrum strengths according to outputs from the second and third photoelectric converter means, to thereby calculate absolute spectrum values of the measured light at every wavelength of the light to be measured.

According to another aspect of the present invention, there is provided an optical spectrum analyzer comprising:

a spectroscope element of the dispersion type for diffracting measured light entering through an inlet slit;

measured-light receiving means for receiving the light, which has been diffracted by the spectroscope element of the dispersion type, through an outlet slit;

a polarizing element for dividing the light, which has been emitted through the outlet slit, into light polarized parallel to grooves of the spectroscope element of the dispersion type and light polarized perpendicular to the grooves of the spectroscope element;

means for receiving the parallel-polarized light applied from the polarizing element;

means for receiving the perpendicularly-polarized light applied from the polarizing element;

optical-path switching means interposed between the outlet slit and the measured-light receiving means to selectively switch or direct the optical path of the light, which has been emitted through the outlet slit, to the polarizing element;

means for calculating the optical strength ratio of a photoelectric conversion signal applied from the perpendicularly-polarized light receiving means and a photoelectric conversion signal applied from the parallel-polarized light receiving means; and means for correcting the photoelectric conversion signal applied from the measured-light receiving means with the optical strength ratio calculated by the optical strength ratio calculating means.

According to a further aspect of the present invention, the optical-path switching means in the second example of the optical spectrum analyzer is inserted in the optical path of the measured light extending to the spectroscope element of the dispersion type to selectively direct the measured light, which is not diffracted yet, to the polarizing element.

According to the optical spectrum analyzer having one of the above-described arrangements, the optical strength of light, which has been diffracted by the spectroscope element of the dispersion type while operating the optical-path switching means is measured by the measured-light receiving means and the optical strength $I_O(\lambda)$ is obtained from the photoelectric conversion signal of light which is not polarized and separated yet. The light which has been diffracted by the spectroscope element of the dispersion type while operating the optical-path switching means is then polarized into both of the directions to calculate optical strength ratio $A(\lambda)$ between the optical strength representing signals of each of the polarized lights.

Wavelength sensitivity characteristics $P_O(\lambda)$, $S_O(\lambda)$, $P(\lambda)$ and $S(\lambda)$ including conversion efficiencies of measured-light receiving means and parallel- and perpendicularly-polarized lights receiving means in those directions parallel and perpendicular to the grooves of the spectroscope element of the dispersion type are already known. Therefore, true optical strengths $I_P(\lambda)$ and $I_S(\lambda)$ of light incident onto the diffraction grating in either of the directions can be calculated from optical strength ratio $A(\lambda)$ and optical strength $I_O(\lambda)$ of light not divided. Absolute spectrum value $I(\lambda)$ which does not depend upon the polarization direction of the measured light can be thus calculated.

This absolute spectrum value $I(\lambda)$ includes, as error causes, only optical strength $I_O(\lambda)$ of the light which is not divided yet and whose S/N ratio is large, and optical strength ratio $A(\lambda)$. The S/N ratio of absolute spectrum value $I(\lambda)$ can be thus raised to a greater extent, as compared with that attained by the conventional analyzer.

According to the optical spectrum analyzer having the other of the above-described arrangements, the optical-path switching means is located before the spectroscope element of the dispersion type. Light applied to the polarizing element is therefore the same as the measured light which is not diffracted yet. The optical strength of the measured light which is not diffracted yet is larger at every wavelength than that of the light which has been diffracted. The optical strength of each of the polarized lights becomes larger accordingly. The S/N ratio of optical strength ratio $A(\lambda)$ obtained can be thus raised to a remarkable extent. Absolute spectrum value $I(\lambda)$ includes, as error causes, only optical strength $I_O(\lambda)$ of the light which is not polarized and separated yet and whose S/N ratio is large, and optical strength ratio $A(\lambda)$. The S/N ratio of absolute spectrum value $I(\lambda)$ can be thus raised to a greater extent, as compared with that attained by the conventional analyzer. According to the present invention, optical strength ratio $A(\lambda)$ is not measured at every wavelength $\lambda$. Therefore, the optical spectrum analyzer according to the present invention is quite useful for spectrum-analyzing the measured light whose optical strength ratio is not greatly changed at each of the wavelengths.

Other objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Some embodiments of the present invention will be described in detail with reference to the accompanying drawings.

Figure 1:
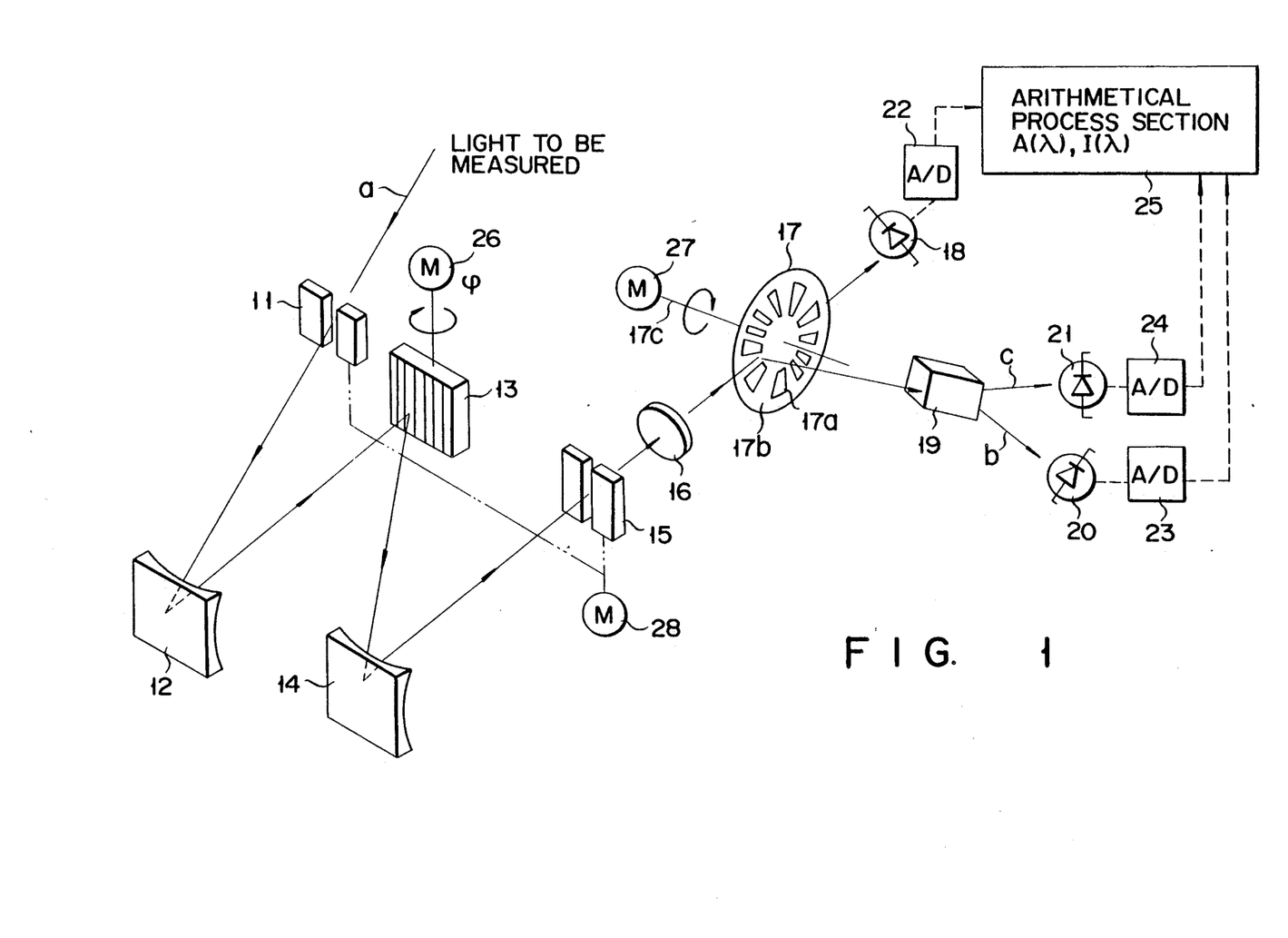
FIG. 1 shows a first example of the optical spectrum analyzer according to the present invention, particularly an arrangement of its main portion.

FIG. 1 shows a first embodiment of the optical spectrum analyzer according to the present invention, particularly an arrangement of its main portion. Measured light (a) inputted from outside is introduced to collimator mirror 12 through inlet slit 11 and its rays are made parallel to one another by collimator mirror 12. These rays are then made incident onto diffraction grating 13 which is rotated by motor 26. The rays thus diffracted by diffraction grating 13 are collected by camera mirror 14 which is a concave mirror lens, and passed through outlet slit 15. The light passed through outlet slit 15 is passed through slits 17a of optical-path changing device 17 by lens 16 and then received by measured-light receiving device 18.

As shown in FIG. 1, optical-path changing device 17 is a disk-like chopper interposed in and tilted relative to the optical path extending from lens 16 to measured-light receiving device 18. This disk-like chopper has slits 17a radially directed and mirror portions 17b each interposed between adjacent slits 17a, and it is rotated around its axial center 17c by motor 27 such as a stepping motor and a DC motor. The light coming out of outlet slit 15 is introduced onto the rotating disk and when the light comes to one of slits 17a it is allowed to pass through slit 17a and reach measured-light receiving device 18. When the light comes to mirror portion 17b, however, it is reflected to come onto polarizing element 19.

This polarizing element 19 is made of calcite (crystalline material of the monoclinic system) and serves to divide the incident light into light (b) polarized parallel to the grooves of diffraction grating 13 and light (c) polarized perpendicular to the grooves of diffraction grating 13. Parallel-polarized light (b) and perpendicularly-polarized light (c) are received by light receiving devices 20 and 21, respectively.

These light receiving devices 18, 20 and 21 convert the lights thus received into photoelectric conversion signals which denote optical strengths of these lights. These photoelectric conversion signals outputted from light receiving devices 18, 20 and 21 are converted into digital signals $I_O(\lambda)$, $I_X(\lambda)$ and $I_Y(\lambda)$, which represent the optical strengths, by A/D converters 22, 23 and 24 and these digital signals are applied to arithmetical process section 25 which includes microcomputers, for example. Optical strength ratio $A(\lambda)$ and absolute spectrum value $I(\lambda)$ of each of wavelengths $\lambda$ are calculated at arithmetical process section 25.

When slit 17a of optical-path switching device 17 is in coincidence with the optical path in the case of this optical spectrum analyzer, the light diffracted by diffraction grating 13 can advance straight without changing its optical path and it is received, as light having no insertion loss of the polarizing element 19, by measured-light receiving device 18. It is then applied, as optical strength $I_O(\lambda)$, to arithmetical process section 25 through A/D converter 22.

When mirror portion 17b of optical-path switching device 17 is in coincidence with the optical path, the light diffracted by diffraction grating 13 is reflected by mirror portion 17b to change its optical path, and it is then divided into parallel- and perpendicularly-polarized lights (b) and (c) by means of polarizing element 19. These parallel- and perpendicularly-polarized lights (b) and (c) are received, as those having insertion loss of the polarizing element 19, by light receiving devices 20 and 21, and then applied, as measured optical strengths $I_X(\lambda)$ and $I_Y(\lambda)$, to arithmetical process section 25 through A/D converters 23 and 24.

It is assumed that diffraction grating 13 and the light receiving devices 20 and 21 including wavelength characteristics of the polarizing element 19, has such wavelength sensitivity characteristics $P(\lambda)$ and $S(\lambda)$ as shown in FIG. 12.

When it is so arranged, true optical strengths $I_S(\lambda)$ and $I_P(\lambda)$ which are represented by lights incident onto diffraction grating 13 in either of the directions can be obtained by equations (1) and (2) mentioned above in the Background of the Invention. Therefore, absolute spectrum value $I(\lambda)$ which does not depend on the direction (or angle α) of light vibrated relative to the grooves of diffraction grating 13 can be obtained by the above-mentioned equation (3): $I(\lambda)=I_S(\lambda)+I_P(\lambda)$.

The relation between the ratio of true optical strengths $I_S(\lambda)$ and $I_P(\lambda)$ of lights incident onto diffraction grating 13 and the ratio of lights passing through diffraction grating 13 in any of the directions can be expressed by the following equation (4):

$$I_S(\lambda)/I_P(\lambda) = \{I_Y(\lambda)/S(\lambda)\}/\{I_X(\lambda)/P(\lambda)\} \quad (4)$$

Optical strength $I_O(\lambda)$ measured by light receiving device 18 can be expressed by the following equation (5), providing that the wavelength sensitivity characteristic in both of the directions be $P_O(\lambda)$ and $S_O(\lambda)$:

$$I_O(\lambda) = I_P(\lambda) \cdot P_O(\lambda) + I_S(\lambda) \cdot S_O(\lambda) \quad (5)$$

Ratio $A(\lambda)$ of optical strengths $I_P(80)$ and $I_S(\lambda)$ of parallel- and perpendicularly-polarized rays of the incident light is expressed by $\{I_P(\lambda)/I_S(\lambda)\}$. When $I(\lambda)$ is calculated from this optical strength ratio $A(\lambda)$ and above equations (3), (4) and (5), therefore, it can be expressed by the following equation (6):

$$I(\lambda) = I_O(\lambda) \cdot \{1+A(\lambda)\}/\{A(\lambda) \cdot S_O(\lambda)+P_O(\lambda)\} \quad (6)$$

More specifically, absolute spectrum value $I(\lambda)$ can be calculated from equation (6) when optical strength $I_O(\lambda)$ of light which is received by measured-light receiving device 18 and which has no insertion loss of polarizing element 19 but a high ratio of S/N is corrected by wavelength sensitivity characteristics $P(\lambda)$, $S(\lambda)$ and $P_O(\lambda)$, $S_O(\lambda)$ which are efficiency factors of each receiving device to diffraction grating 13 in either of the directions, and also by optical strength ratio $A(\lambda)$ between the polarized lights calculated from $P(\lambda)$ and $S(\lambda)$ received by light receiving devices 20 and 21.

Therefore, absolute spectrum value $I(\lambda)$ obtained from equation (6) does not depend upon the direction (angle α) of measured light (a) polarized relative to the grooves of diffraction grating 13.

The S/N ratio of absolute spectrum value $I(\lambda)$ obtained from equation (6) in the case of the optical spectrum analyzer according to the present invention will be compared with that of absolute spectrum value $I(\lambda)$ obtained from equation (3) in the case of the conventional analyzer. Wavelength sensitivity characteristics $P(\lambda)$, $S(\lambda)$ and $P_O(\lambda)$, $S_O(\lambda)$ can be previously and precisely measured and set at the memory area (not shown) of a random access memory (RAM) and the like in arithmetical process section 25. Absolute spectrum value $I(\lambda)$ obtained from equation (3) is determined by S/N ratios of optical strengths $I_X(\lambda)$ and $I_Y(\lambda)$ of divided polarized lights (b) and (c). Each of these S/N ratios influences equally S/N ratio of total $I(\lambda)$.

On the other hand, absolute spectrum value $I(\lambda)$ obtained from equation (6) is determined by S/N ratio of optical strength $I_O(\lambda)$ of light not divided and also by the S/N ratio of optical strength ratio $A(\lambda)$ between optical strengths $I_X(\lambda)$ and $I_Y(\lambda)$ of polarized lights (b) and (c). The S/N ratio of optical strength $I_O(\lambda)$ of light not divided contributes to the S/N ratio of total $I(\lambda)$ to a great extent, but the contribution of the S/N ratio of optical strength ratio $A(\lambda)$ is low. Therefore, the S/N ratio of total $I(\lambda)$ approaches to that of optical strength $I_O(\lambda)$ of light not polarized and separated.

The S/N ratio of optical strength $I_O(\lambda)$ of light not divided is much higher than that of each of optical strengths $I_X(\lambda)$ and $I_Y(\lambda)$ of divided polarized lights (b) and (c). As the result, the S/N ratio of absolute spectrum value $I(\lambda)$ obtained from equation (6) in the case of this embodiment can be enhanced to a greater extent of about 6 dB, as compared with that of absolute spectrum value $I(\lambda)$ obtained from equation (3) in the case of the conventional analyzer.

The measurement accuracy of the optical spectrum analyzer can be thus enhanced.

Figure 2:
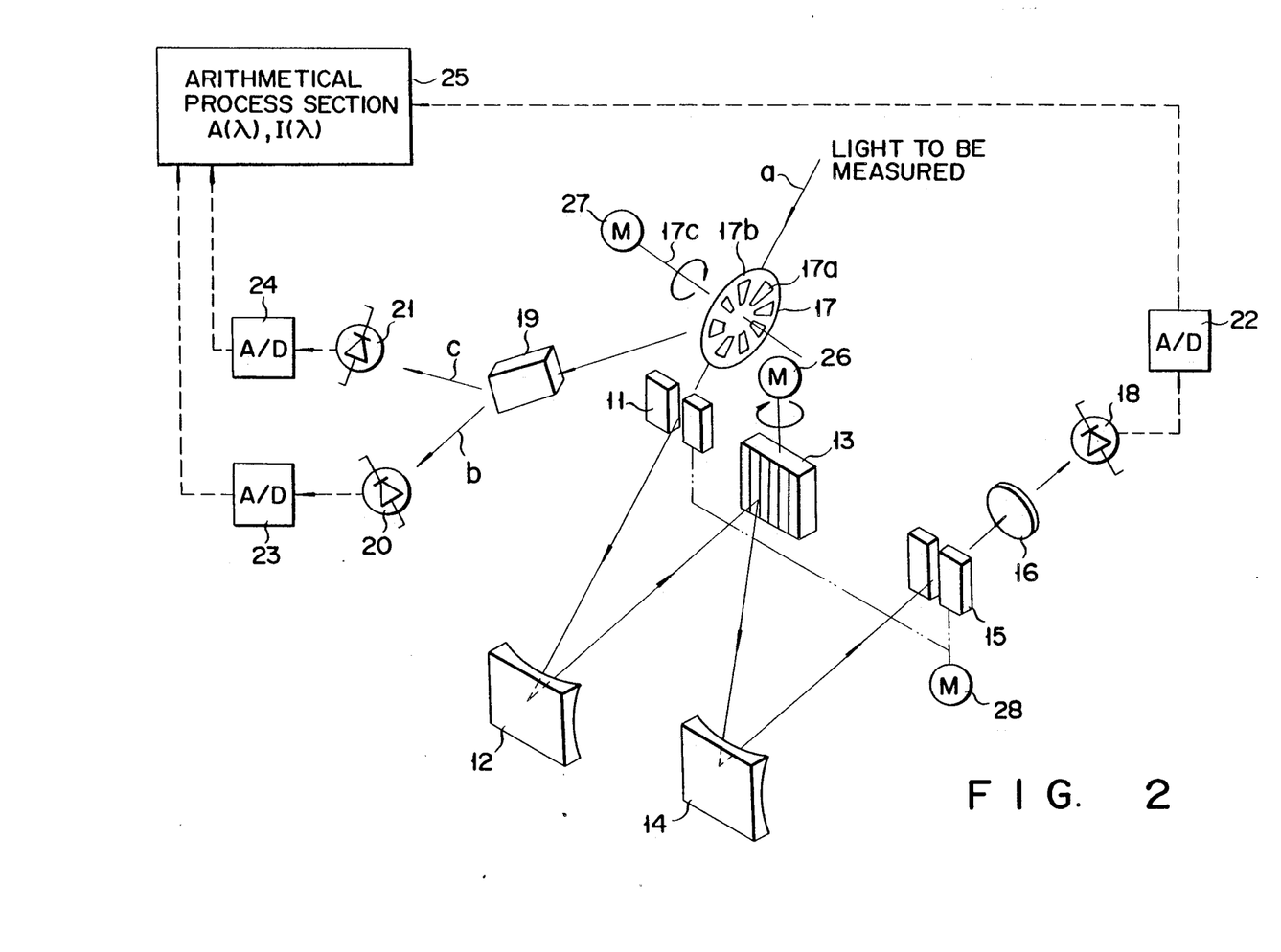
FIG. 2 shows a second example of the optical spectrum analyzer according to the present invention, particularly an arrangement of its main portion.

FIG. 2 shows a second embodiment of the optical spectrum analyzer according to the present invention. Same components as those in FIG. 1 will be denoted by same reference numerals and description of these components will be omitted.

In the case of the second optical spectrum analyzer, the optical-path switching device 17 which has been interposed between outlet slit 15 and measured-light receiving device 18 in FIG. 1 is now located before inlet slit 11.

According to the optical spectrum analyzer having the above-described arrangement, measured-light (a) coming from outside is passed through one of slits 17a of optical-path switching device 17, introduced onto diffraction grating 13 through inlet slit 11 and diffracted by diffraction grating 13. The diffracted lights are collected by camera mirror 14, received by measured-light receiving device 18 through outlet slit 15 and lens 16 and converted into a photoelectric conversion signal which denotes the optical strength of the light received. This photoelectric conversion signal is further converted into a digital signal, which denotes optical strength $I_O(\lambda)$, by means of A/D converter 22 and this digital value is applied to arithmetical process section 25.

On the other hand, measured-light (a) introduced is reflected by mirror portion 17b of optical-path switching device 17 and directed onto polarizing element 19. Measured-light (a) which has been introduced onto polarizing element 19 but not diffracted yet is polarized and separated into light (b) which is polarized parallel to the grooves of diffraction grating 13 and light (c) which is polarized perpendicular to the grooves of diffraction grating 13. Parallel- and perpendicularly-polarized lights (b) and (c) thus polarized and separated are converted into photoelectric conversion signals by parallel- and perpendicularly-polarized light receiving devices 20 and 21, respectively. These optical strength representing signals are further converted into digital signals, which denote optical strengths $I_X$ and $I_Y$, by A/D converters 23 and 24 and then applied to arithmetical process section 25.

Arithmetical process section 25 calculates optical strength ratio A from the following equation (7), using optical strengths $I_X$ and $I_Y$ applied.

$$A = \{I_Y/S(\lambda)\}/\{I_X/P(\lambda)\} \quad (7)$$

Therefore, the optical strength ratio between optical strengths $I_S$ and $I_P$ of lights incident onto diffraction grating 13 in either of the directions does not depend upon wavelength λ but can be expressed by optical strength ratio A.

$$A = I_S/I_P \quad (8)$$

Therefore, absolute spectrum value $I(80)$ which does not depend upon the direction in which measured-light (a) is polarized relative to the grooves of diffraction grating 13 can be finally calculated every wavelength from the following equation (9).

$$I(\lambda) = \{I_0(\lambda) \cdot (1+A)\} / \{A \cdot S_0(\lambda) + P_0(\lambda)\} \quad 9)$$

Optical strength ratio A used by equation (10) is calculated from optical strengths $I_X$ and $I_Y$ of measured-light (a) in both of the directions which is not diffracted by diffraction grating 13 but includes all wavelength components. Therefore, this optical strength ratio A includes all wavelength components.

Optical strengths $I_X$ and $I_Y$ of polarized lights (b) and (c) which are not diffracted but include all wavelength components are extremely higher, as compared with optical strengths $I_X(\lambda)$ and $I_Y(\lambda)$ of polarized lights (b) and (c) which have been diffracted to wavelengths $\lambda$ as shown in FIG. 1. This makes the S/N ratio higher. Therefore, the S/N ratio of optical strength ratio A obtained by the analyzer shown in FIG. 2 becomes extremely higher than that of optical strength ratio A obtained by the analyzer shown in FIG. 1. Absolute spectrum value $I(\lambda)$ which is expressed by equation (9) and obtained by the analyzer shown in FIG. 2 can enhance its S/N ratio to greater extent, as compared with absolute spectrum value $I(\lambda)$ which is expressed by equation (6) and obtained by the analyzer shown in FIG. 1.

It is assumed in the case of this second optical spectrum analyzer that optical strength ratio A of optical strengths $I_X$ and $I_Y$ of polarized lights (b) and (c) is not greatly changed by wavelength $\lambda$. Therefore, the second optical spectrum analyzer is quite useful for spectrum-analyzing measured-light (a) whose optical strength ratio A is not greatly changed by wavelength $\lambda$.

Figure 3:
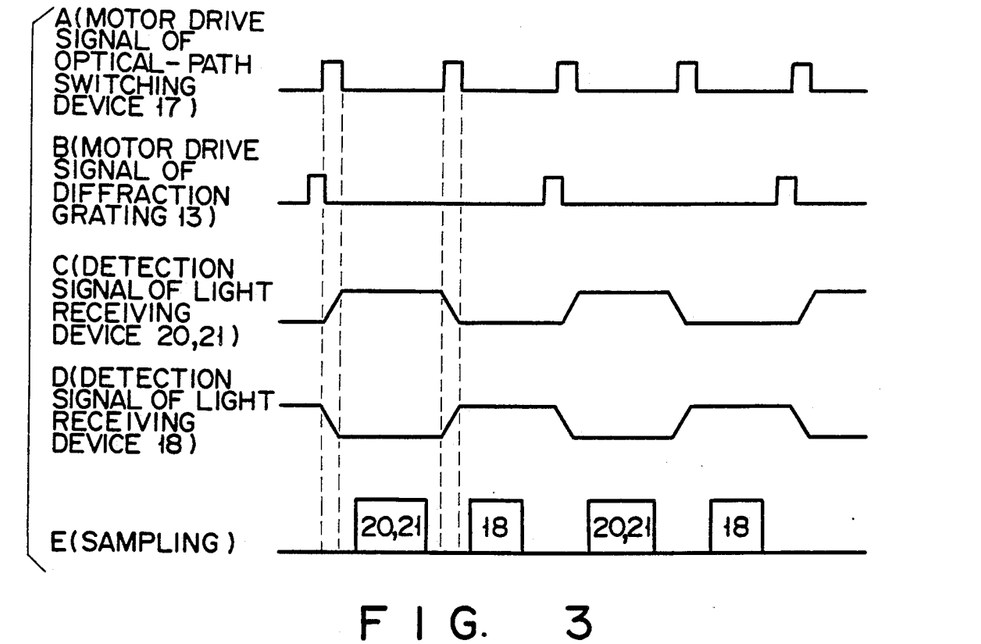
FIG. 3 is a time chart showing an example of timings at which light strength is sampled by each of the light receiving means shown in FIGS. 1 and 2.

In a case where optical strengths $I_0(\lambda)$, $I_X$ and $I_Y$ are measured by measured-light receiving device 18, parallel- and perpendicularly-polarized light receiving devices 20 and 21 in the first and second embodiments of the present invention, sampling is carried out adjusting its timing with optical-path switching device 17, as shown in the timing chart in FIG. 3. Every time when optical-path switching device 17 is rotated by one step in response to motor drive signal shown by A in FIG. 3, slit 17a and mirror portion 17b of device 17 are alternately interposed in the optical path. When optical-path switching device 17 is rotated by two steps, therefore, optical strengths at one wavelength $\lambda$ can be obtained by light receiving devices 20, 21 and 18, respectively. After optical-path switching device 17 is rotated by two steps, diffraction grating 13 is rotated by one step in response to the motor drive signal shown by B in FIG. 3 to shift wavelength $\lambda$ to be measured to a next wavelength. This shift of wavelength $\lambda$ to be measured can be attained when the diffraction grating 13 is rotated by motor 26 shown in FIGS. 1 and 2.

Figure 4:
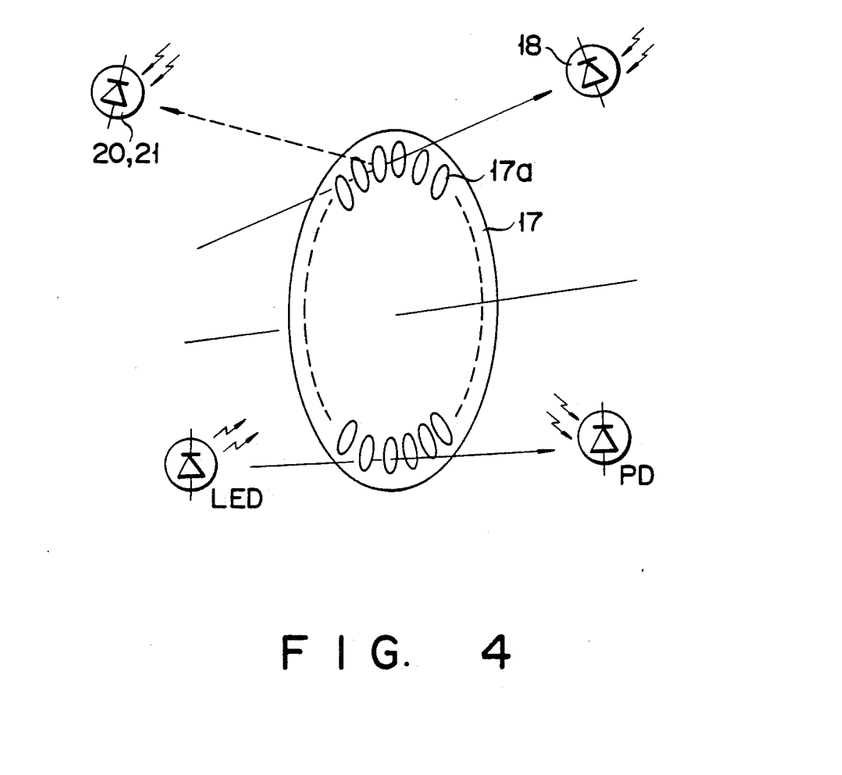
FIG. 4 shows a photo-interrupter employed in another case where light strength is sampled by each of the light receiving means shown in FIGS. 1 and 2.
Figure 5:
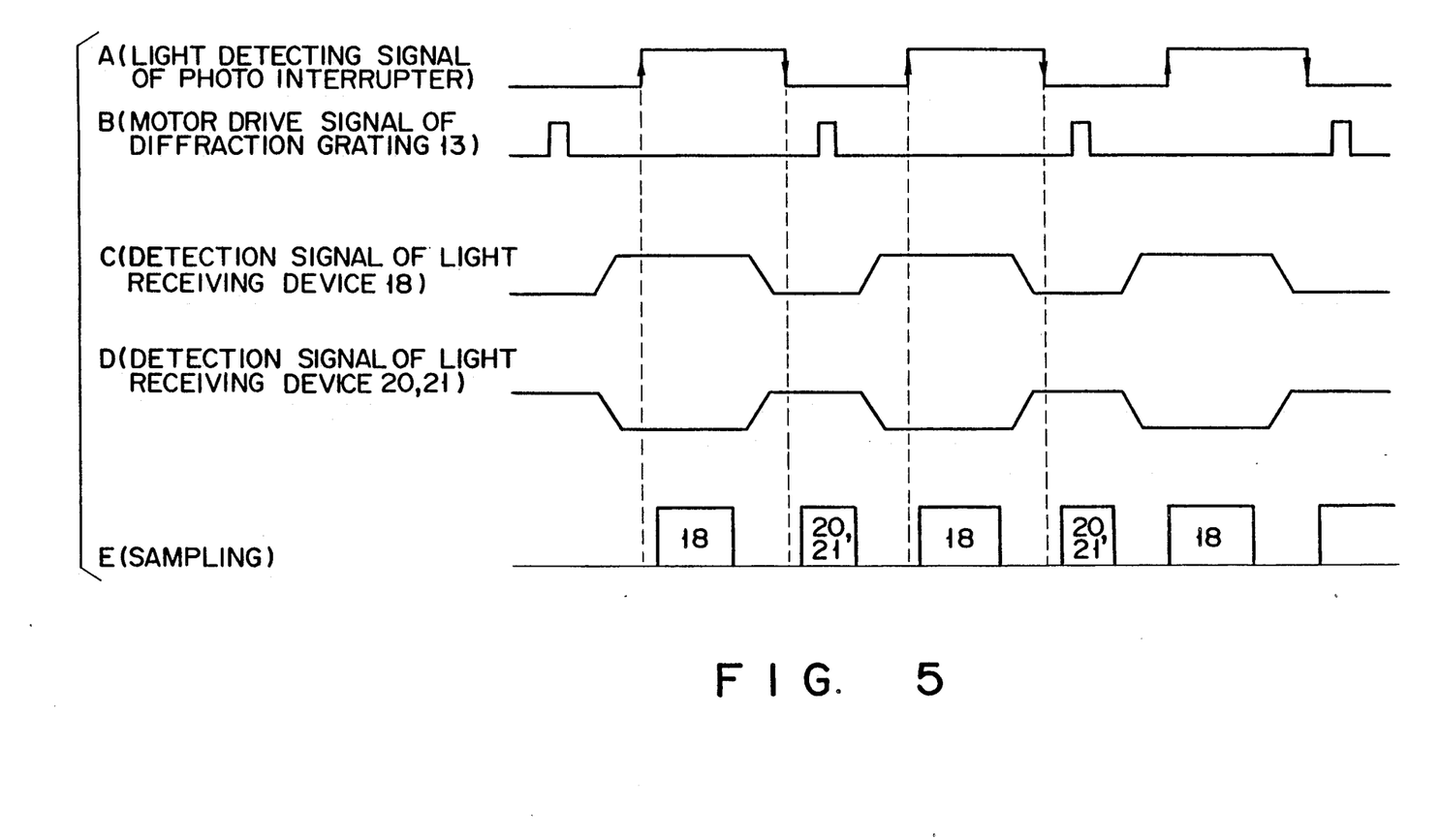
FIG. 5 is a time chart showing another example of timings at which light strength is sampled by each of the light receiving means shown in FIGS. 1 and 2, using the photo-interrupter shown in FIG. 4.

FIGS. 4 and 5 show another example of measuring optical strengths by light receiving devices 18, 20 and 21. As shown in FIG. 4, a photo-interrupter which comprises a light-emitting diode (LED) and a photo-diode (PD) for detecting slits 17a of optical-path switching device 17 is added to sample the optical strength representing signal of each of light receiving devices 18, 20 and 21 in response to a light detection signal applied from this photo-interrupter. More specifically, as shown in FIG. 5, when diffraction grating 13 is rotated by one step, receiving level $I_{Ol}$ measured by light receiving device 18 and offset levels $I_{X2}$ and $I_{Y2}$ of the receiving devices 20 and 21 are sampled after the rising of the light detection signal. Offset level $I_{Ol}$ of receiving device 18 and receiving levels $I_{Xl}$ and $I_{Yl}$ by light receiving devices 20 and 21 are sampled after the falling of the light detection signal. Accurate receiving levels $I_0(\lambda)$, $I_X(\lambda)$ and $I_Y(\lambda)$ are calculated from the differences between receiving levels and offset levels.

Figure 6:
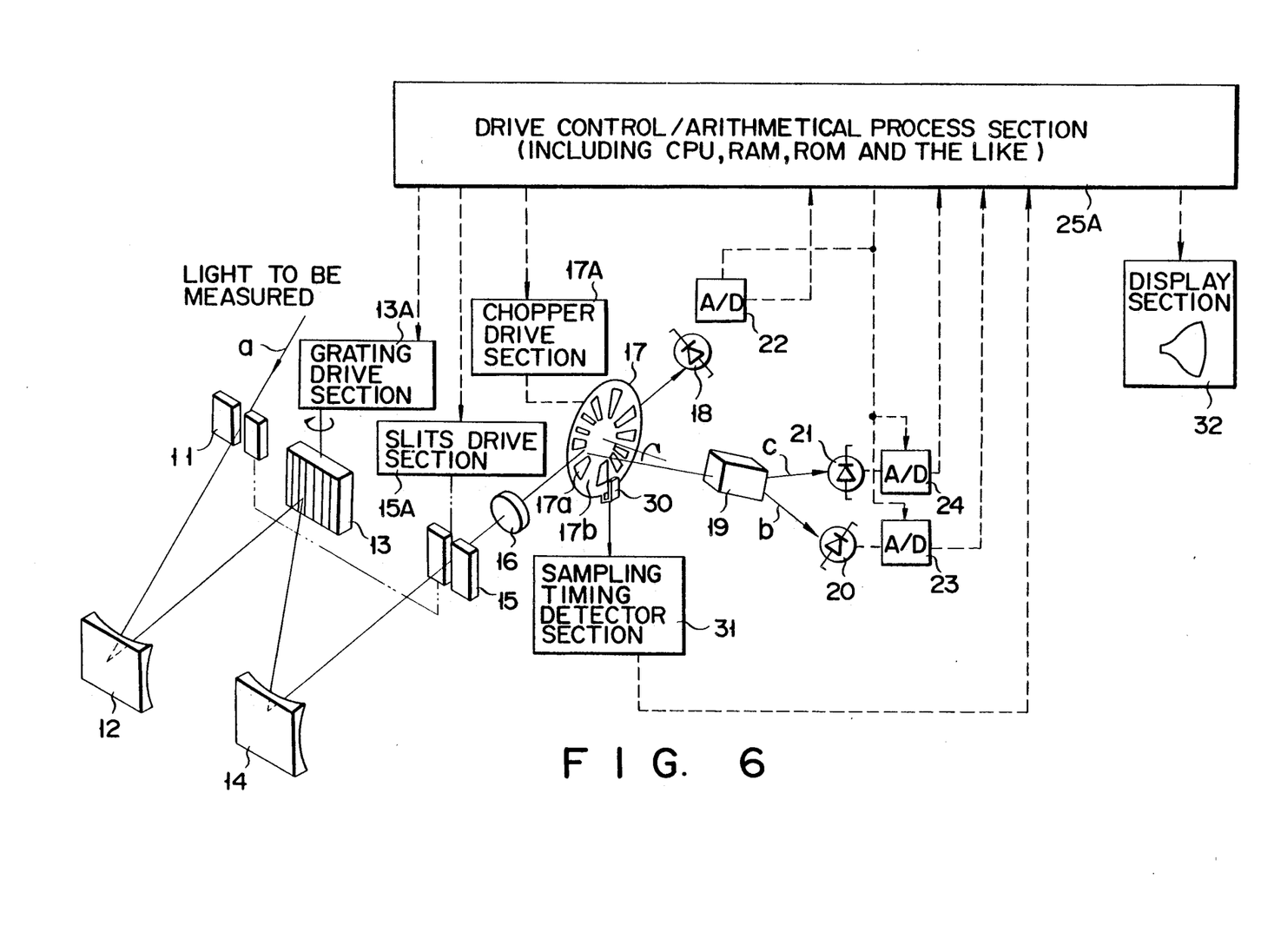
FIG. 6 shows a third example of the optical spectrum analyzer according to the present invention.

FIG. 6 shows a third embodiment of the optical spectrum analyzer according to the present invention which has an arrangement more concrete than that of the first optical spectrum analyzer. Same components as those in FIG. 1 will be denoted by same reference numerals and description of these components will be omitted.

Instead of arithmetical process section 25 shown in FIG. 1, the optical spectrum analyzer of the third embodiment uses drive control and arithmetical process section 25A which includes a peripheral circuit comprising a micro-processor (CPU), a RAM, a read-only memory (ROM) and the like.

Diffraction grating 13, inlet and outlet slits 11 and 15, and optical-path switching device 17 are provided with their respective drive sections 13A, 15A and 17A each including a motor for driving its corresponding means.

Grating, slits and chopper drive signals which will be described later are supplied from drive control and arithmetical process section 25A to these drive sections 13A, 15A and 17A.

Optical-path switching device 17 is provided with photo-interrupter 30 to take sampling timings, as seen in FIG. 4. This photo-interrupter 30 is connected to drive control and arithmetical process section 25A through sampling timing detecting section 31.

Display section 32 including a cathode ray tube (CRT) and the like is also connected to drive control and arithmetical process section 25A to display absolute spectrum value $I(\lambda)$ and the like finally obtained.

Figure 7:
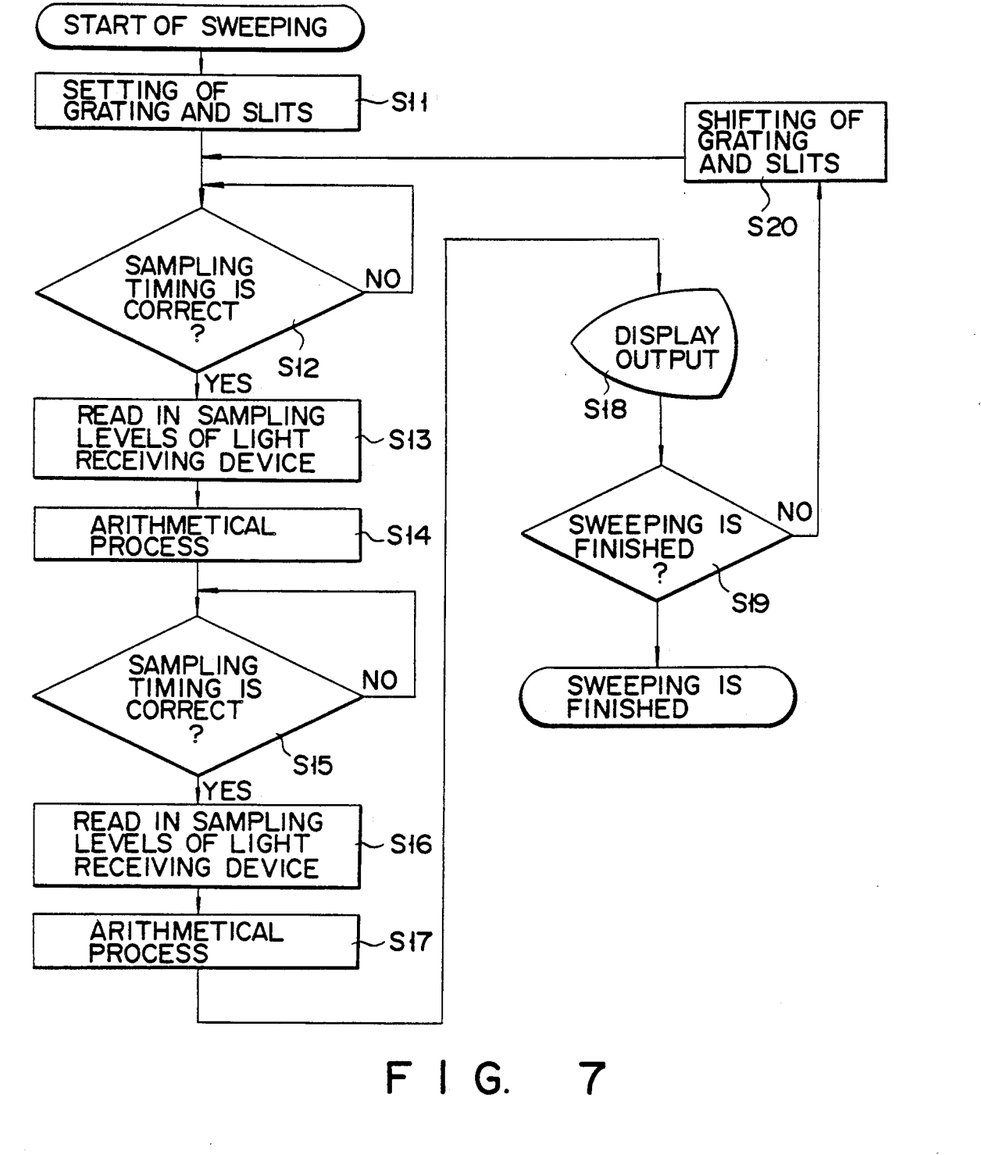
FIGS. 7 and 8 are flow and timing charts intended to explain the operation of the third optical spectrum analyzer shown in FIG. 6.

The operation of sweep-measuring the spectrum of measured light which is carried out by the optical spectrum analyzer having the above-described arrangement will be described with reference to the flow chart shown in FIG. 7 and the timing chart shown in FIG. 8.

Figure 8:
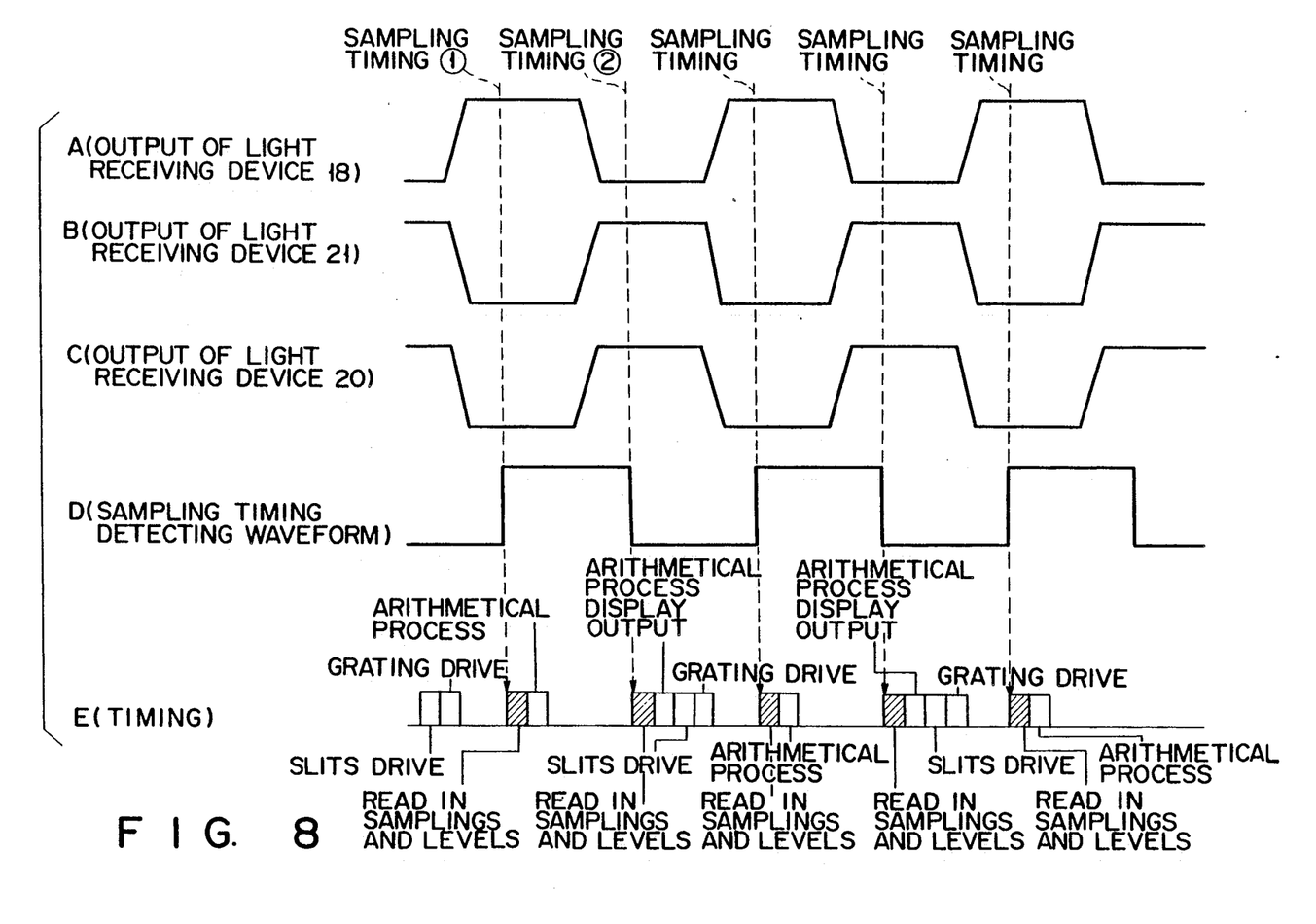

Drive control and arithmetical process section 25A drives diffraction grating 13, inlet and outlet slits 11 and 15 through grating and slits drive sections 13A and 15A at such a timing as shown at the left end of E in FIG. 8 and in response to grating and slits drive signals. Grating 13, inlet and outlet slits 11 and 15 are thus set at those positions which correspond to a start wavelength (step S11). When grating 13, inlet and outlet slits 11 and 15 are kept under this condition, drive control and arithmetical process section 25A detects first sampling timing 1 at the rising of such a detected waveform as shown at D in FIG. 8, said detected waveform being obtained through photointerrupter 30 and sampling timing detecting section 31 which are attached to optical-path switching device 17 and driven at a certain rotation speed through chopper drive section 17A and in response to chopper drive signal (step S12). At the same time when this first sampling timing 1 is detected, drive control and arithmetical process section 25A reads in levels sampled through light receiving devices 18, 20, 21 and A/D converters 22, 23, 24 relating to the light passed through and shielded by optical-path switching device 17, and carries out an arithmetical process on the basis of the light levels as shown in the first embodiment of the present invention (steps S13 and S14). Second sampling timing 2 is similarly detected at the falling of the sampling timing detecting waveform shown at D in FIG. 8 (step S15). At the same time, levels relating to the light passed through and shielded by optical-path switching device 17 are read in and a necessary arithmetical process is carried out (steps S16 and S17). It is arranged that drive control and arithmetical process section 25A carries out an operation to get light levels of the measured light (or incident light) as well as such operation as shown in detail in the first embodiment of the present invention to correct sensitivity.

Drive control and arithmetical process section 25A applies the levels of the incident light thus obtained to display section 32 (step S18). When step S19 for answering whether or not the sweep measurement is finished says "no", grating 13, inlet and outlet slits 11 and 15 are again set to correspond to a next wavelength to be measured (step S20) and the detection of sampling timings is repeated, starting from step S12 and ending with step S20. The measurement of the spectrum to be swept is thus finished.

To summarize the above, the present invention is characterized, as apparent from the first through third embodiments, in that level measuring and light receiving device 18 is provided independently of polarized-light receiving devices 20 and 21 which serve to measure the state of polarized light and detect the ratio of P and S waves. Namely, measured light (a) passes through optical-path switching device 17 which also serves as the chopper, but it enters directly into level measuring and light receiving device 18. This can prevent detection sensitivity from being damaged. On the other hand, the measured light also enters into polarized-light receiving devices 20 and 21, passing through optical-path switching device 17. However, receiving devices 20 and 21 only detect the state of polarized light to count input levels of the measured-light backward. Therefore, loss of light caused by polarizing element 19 gives no influence to the detection sensitivity attained.

Values detected by receiving device 20 and 21 are subjected to arithmetical process together with angles (or wavelengths) of diffraction grating 13 set and diffraction efficiency data (relating to every polarized component) of diffraction grating 13, and used as correction values which are added to level measuring values obtained by device 18. This enables spectrum measurement to be achieved with a high level likelihood ratio.

According to the present invention, the influence of polarizing characteristics of the diffraction grating can be eliminated without damaging the sensitivity of measuring levels. This makes it possible to realize an optical spectrum analyzer which has a high sensitivity (6 dB higher) and a high likelihood ratio.

The present invention is not limited to its above-described embodiments, but an A/0 (acoustical/optical) switch may be used instead of optical-path switching device 17.

Figure 9:
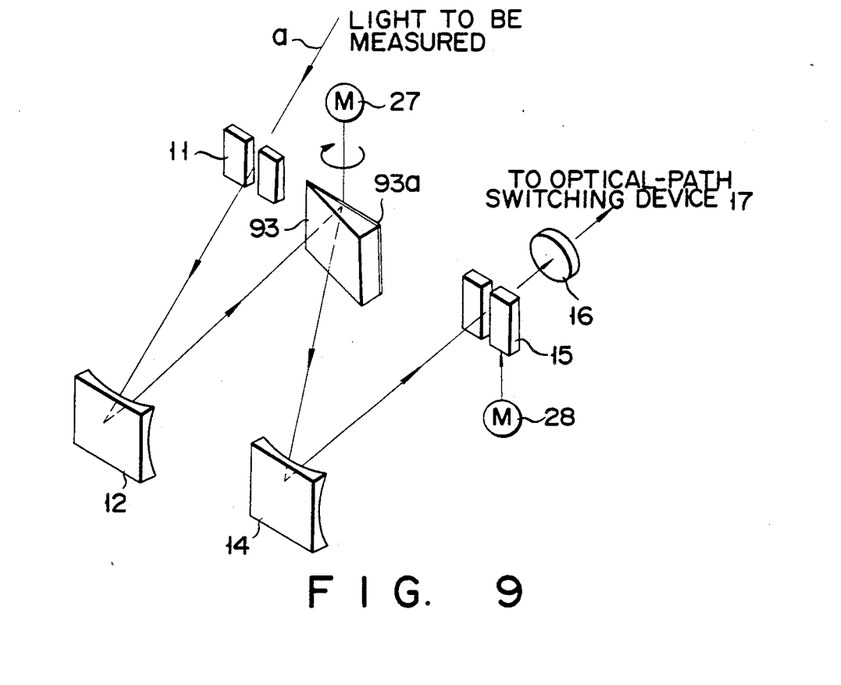
FIG. 9 shows a further spectroscope of the dispersion type, particularly an arrangement of its main portion.

Prism 93 having an aluminum film 93a evaporated on a rear surface thereof shown in FIG. 9 may be used instead of the diffraction grating.

According to the optical spectrum analyzer of the present invention as described above, the optical strength ratio of lights polarized parallel and perpendicular to the grooves of the spectroscope of the dispersion type is calculated and the optical strength of light not polarized is corrected by this optical strength ratio. This can enhance the ratio S/N of absolute values which are obtained every wavelength relating to the optical spectrum of light to be measured, the light being analyzed according to wavelengths. As the result, the measurement accuracy of the analyzer can be enhanced.

The two polarized lights may be applied to lights other than lights polarized parallel and perpendicular to the grooves of the diffraction grating.

What is claimed is:

1. An optical spectrum analyzer comprising:
    spectroscope means of the dispersion type for receiving light to be measured and emitting it as dispersed light which corresponds to each of wavelengths to be measured;
    optical-path switching means for directing the dispersed light emitted from the spectroscope means to pass through first and second paths;
    first photoelectric converter means for receiving the light which is directed to pass through the first path by the optical-path switching means;
    polarizing/separating means for polarizing and separating the light, which is directed to pass through the second path by the optical-path switching means, into two polarized lights;
    second and third photoelectric converter means for respectively receiving the two polarized lights polarized and separated by the polarizing/separating means; and
    arithmetical process means for correcting a first optical spectrum strength according to an output from said first photoelectric converter means with at least a ratio of second and third optical spectrum strengths according to outputs from said second and third photoelectric converter means, to thereby calculate absolute spectrum values of the measured light at every wavelength of the light to be measured.

2. The optical spectrum analyzer according to claim 1, wherein said spectroscope means of the dispersion type comprises a spectroscope of the dispersion type and optical means including a collimator mirror for directing the measured light onto the spectroscope of the dispersion type and collimator mirror for reflecting the light dispersed by the spectroscope of the dispersion type.

3. The optical spectrum analyzer according to claim 2, wherein said spectroscope of the dispersion type includes a diffraction grating.

4. The optical spectrum analyzer according to claim 2, wherein said spectroscope of the dispersion type includes a prism.

5. The optical spectrum analyzer according to claim 2, wherein said optical means further includes an inlet slit through which the measured light enters and an outlet slit through which the dispersed light is emitted.

6. The optical spectrum analyzer according to claim 5, wherein said spectroscope of the dispersion type includes means for shifting the spectroscope of the dispersion type as well as the inlet and outlet slits to correspond to a wavelength of the light to be measured.

7. The optical spectrum analyzer according to claim 1, wherein said optical-path switching means includes a means for introducing an optical output, which causes no insertion loss, at least through the first path.

8. The optical spectrum analyzer according to claim 7, wherein said optical-path switching means further includes a chopper provided with slits which allow the first path to be established and with a mirror portion which allows the second path to be established.

9. The optical spectrum analyzer according to claim 1, further comprising first, second and third A/D converter means for respectively A/D-converting outputs applied from said first, second and third photoelectric converter means.

10. The optical spectrum analyzer according to claim 9, further comprising a sampling timing detector means for detecting those sampling timings at which said first, second and third A/D converter means carry out their A/D conversions, associating with timings at which the dispersed light is directed to the first and second paths.

11. The optical spectrum analyzer according to claim 10, wherein said sampling timing detector means includes a photointerrupter.

12. The optical spectrum analyzer according to claim 1, wherein said arithmetical process means carries out correction in view of wavelength sensitivity characteristics of the spectroscope means of the dispersion type, said characteristics serving as efficiency factors.

13. The optical spectrum analyzer according to claim 12, wherein said arithmetical process means includes means for storing the wavelength sensitivity characteristics.

14. An optical spectrum analyzer comprising:
a spectroscope element of the dispersion type for separating measured light entering through an inlet slit;
measured-light receiving means for receiving the light, which has been separated by the spectroscope element of the dispersion type, through an outlet slit;
a polarizing element for dividing the light, which has been emitted through the outlet slit, into light polarized parallel to grooves of the spectroscope element of the dispersion type and light polarized perpendicular to the grooves of said spectroscope element;
means for receiving the parallel-polarized light applied from the polarizing element;
means for receiving the perpendicularly-polarized light applied from the polarizing element;
optical-path switching means interposed between the outlet slit and the measured-light receiving means for selectively switching or directing the light, which has been emitted through the outlet slit, to the polarizing element;
means for calculating the optical strength ratio of a photoelectric conversion signal applied from the perpendicularly-polarized light receiving means and a photoelectric conversion signal applied from the parallel-polarized light receiving means; and
means for correcting a photoelectric conversion signal applied from the measured-light receiving means with the optical strength ratio calculated by the optical strength ratio calculating means.

15. An optical spectrum analyzer comprising:
a spectroscope element of the dispersion type for separating measured light entering through an inlet slit;
measured-light receiving means for receiving the light, which has been separated by the spectroscope element of the dispersion type, through an outlet slit;
a polarizing element for dividing the measured light, which has entered through the inlet slit, into light polarized parallel to grooves of the spectroscope element of the dispersion type and light polarized perpendicular to the grooves of said spectroscope element;
means for receiving the parallel-polarized light applied from the polarizing element;
means for receiving the perpendicularly-polarized light applied from the polarizing element;
optical-path switching means interposed in an optical path extending to the spectroscope element of the dispersion type for the measured light for selectively switching or directing the optical path of the measured light applied to the polarizing element;
means for calculating the optical strength ratio of a photoelectric conversion signal applied from the perpendicularly-polarized light receiving means and a photoelectric conversion signal applied from the parallel-polarized light receiving means; and
means for correcting a photoelectric conversion signal applied from the measured-light receiving means with the optical strength ratio calculated by the optical strength ratio calculating means.

* * * * *